US011919395B1

United States Patent
Tin

(10) Patent No.: US 11,919,395 B1
(45) Date of Patent: Mar. 5, 2024

(54) ELECTRONIC DEVICE AND METHOD FOR CONFIGURING HEAD-UP DISPLAY

(71) Applicant: Wistron Corporation, New Taipei (TW)

(72) Inventor: Hsiao-Wen Tin, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 17/958,455

(22) Filed: Oct. 3, 2022

(30) Foreign Application Priority Data

Aug. 25, 2022 (TW) .................................. 111131987

(51) Int. Cl.
*B60K 35/00* (2006.01)
*G06F 3/01* (2006.01)
*G06F 18/214* (2023.01)
*G06T 3/40* (2006.01)
*G08G 1/01* (2006.01)

(52) U.S. Cl.
CPC .............. *B60K 35/00* (2013.01); *G06F 3/013* (2013.01); *G06F 18/214* (2023.01); *G06T 3/40* (2013.01); *G08G 1/0129* (2013.01); *B60K 2370/1529* (2019.05)

(58) Field of Classification Search
CPC . B60K 35/00; B60K 2370/1529; G06F 3/013; G06F 18/214; G06T 3/40; G08G 1/0129
See application file for complete search history.

(56) References Cited

U.S. PATENT DOCUMENTS

| | | | | |
|---|---|---|---|---|
| 9,483,109 | B2* | 11/2016 | Waldman | G06F 16/7844 |
| 10,643,510 | B2* | 5/2020 | Fujita | G09G 3/001 |
| 10,795,166 | B2 | 10/2020 | Huang et al. | |
| 2016/0163108 | A1 | 6/2016 | Kim | |
| 2016/0196098 | A1* | 7/2016 | Roth | G09G 5/00 715/761 |
| 2018/0229654 | A1* | 8/2018 | Unver | G06V 20/597 |
| 2019/0018238 | A1* | 1/2019 | Jenson | G03B 21/62 |
| 2019/0278094 | A1 | 9/2019 | Huang et al. | |
| 2020/0047765 | A1* | 2/2020 | Kishi | G05D 1/0088 |
| 2020/0310552 | A1* | 10/2020 | Betancur Ramirez | G06F 3/014 |

(Continued)

FOREIGN PATENT DOCUMENTS

| | | | | |
|---|---|---|---|---|
| CA | 3214253 A1 * | 10/2022 | | G06N 3/04 |
| DE | 102020202380 A1 * | 8/2021 | | G08G 1/0116 |

(Continued)

OTHER PUBLICATIONS

CA-3214253-A1 translation (Year: 2022).*

(Continued)

*Primary Examiner* — Christopher E Leiby
(74) *Attorney, Agent, or Firm* — JCIPRNET

(57) ABSTRACT

An electronic device and a method for configuring a head-up display are provided. The method includes: obtaining a first coordinate value corresponding to a line of sight of a driver, and obtaining a statistic value corresponding to the first coordinate value; inputting the first coordinate value and the statistic value to a quantum machine learning (ML) model to obtain a first estimated statistic value; and configuring a display area of the head-up display according to the first coordinate value and the first estimated statistic value.

16 Claims, 4 Drawing Sheets

(56) References Cited

U.S. PATENT DOCUMENTS

| | | | | |
|---|---|---|---|---|
| 2020/0353816 | A1* | 11/2020 | Hirata | H04N 9/3194 |
| 2021/0020145 | A1* | 1/2021 | Hirata | G02B 27/0179 |
| 2021/0070176 | A1 | 3/2021 | Rao et al. | |
| 2021/0263586 | A1* | 8/2021 | Wang | G06F 3/0346 |
| 2022/0011572 | A1* | 1/2022 | Kim | G02B 27/01 |
| 2022/0121867 | A1 | 4/2022 | Arar et al. | |
| 2022/0129708 | A1* | 4/2022 | Gamzo | G06V 10/82 |
| 2023/0023121 | A1* | 1/2023 | Cao | G06F 18/214 |

FOREIGN PATENT DOCUMENTS

| | | |
|---|---|---|
| JP | 2011240813 | 12/2011 |
| JP | 2015160445 | 9/2015 |
| TW | I642972 | 12/2018 |

OTHER PUBLICATIONS

DE-102020202380-A1 translation (Year: 2021).*
"Office Action of Taiwan Counterpart Application", dated Sep. 22, 2023, p. 1-p. 5.
"Search Report of Europe Counterpart Application", dated Sep. 25, 2023, p. 1-p. 8.

* cited by examiner

ELECTRONIC DEVICE AND METHOD FOR CONFIGURING HEAD-UP DISPLAY

CROSS-REFERENCE TO RELATED APPLICATION

This application claims the priority benefit of Taiwan application serial no. 111131987, filed on Aug. 25, 2022. The entirety of the above-mentioned patent application is hereby incorporated by reference herein and made a part of this specification.

BACKGROUND

Technical Field

The disclosure relates to an electronic device and a method for configuring a head-up display.

Description of Related Art

At present, the head-up display (HUD) system has become one of the standard equipment of vehicles including aircraft or cars. The head-up display is used to project instrument information to the front of the line of sight of a driver, so as to prevent the driver from being distracted by frequently looking down at the instrument panel. With the advent of augmented reality (AR) technology, information provided by the head-up display system is more diverse. For example, the head-up display system may obtain external environment information of the vehicle by using a device such as a camera, thereby generating navigation information according to the external environment information, and projecting the navigation information to the windshield.

Although the HUD technology has become increasingly complex and plays an increasingly important role, there is still a difficult issue in the HUD technology, that is, the projected image of the HUD may obscure the line of sight of the driver and reduce the grasp of road conditions by the driver. Therefore, how to prevent the projected image of the HUD from obscuring the line of sight of the driver is one of the goals of persons skilled in the art.

SUMMARY

The disclosure provides an electronic device and a method for configuring a head-up display, which can dynamically adjust a display area of the head-up display.

An electronic device for configuring a head-up display of the disclosure includes a processor, a storage medium, and a transceiver. The storage medium stores a quantum machine learning model. The processor is coupled to the storage medium and the transceiver. The processor executes the following. A first coordinate value corresponding to a line of sight of a person is obtained through the transceiver, and a statistic value corresponding to the first coordinate value is obtained. The first coordinate value and the statistic value are input to a quantum machine learning model to obtain a first estimated statistic value. A display area of the head-up display is configured by the first coordinate value and the first estimated statistic value.

In an embodiment of the disclosure, the processor further executes the following. A speed of a vehicle is obtained through the transceiver. A size of the display area is configured by to the speed.

In an embodiment of the disclosure, the speed is inversely proportional to the size.

In an embodiment of the disclosure, the processor further executes the following. An average gaze duration corresponding to the line of sight of the person is obtained through the transceiver. A display content of the head-up display is configured by the average gaze duration. An amount of information of the display content is inversely proportional to the average gaze duration.

In an embodiment of the disclosure, the processor further executes the following. A speed of a vehicle is obtained through the transceiver. An amount of information is determined by the speed. The amount of information is inversely proportional to the speed.

In an embodiment of the disclosure, the processor further executes the following. A writing direction is judged by a display content of the head-up display. A position of the display content in the display area is determined by the writing direction.

In an embodiment of the disclosure, the processor further executes the following. Training data of the quantum machine learning model is obtained through the transceiver. The training data includes a historical coordinate value, a historical statistic value, a historical speed corresponding to a vehicle, and a historical relative traffic flow corresponding to the vehicle. An ideal statistic value corresponding to a line of sight of a person is calculated by the historical coordinate value, the historical statistic value, the historical speed, and the historical relative traffic flow. The quantum machine learning model is trained by a loss function. The loss function is associated with an error between an output statistic value of the quantum machine learning model and the ideal statistic value.

In an embodiment of the disclosure, the processor further executes the following. Multiple probabilities respectively corresponding to multiple candidate statistic values output by the quantum machine learning model by the first coordinate value and the statistic value are obtained. A candidate statistic value corresponding to a maximum probability is selected from the candidate statistic values by the probabilities as the first estimated statistic value.

In an embodiment of the disclosure, the processor further executes the following. A second coordinate value corresponding to the line of sight is obtained through the transceiver. The second coordinate value and the first estimated statistic value are input to the quantum machine learning model, and a second estimated statistic value being obtained. The display area is configured according to the second coordinate value and the second estimated statistic value.

In an embodiment of the disclosure, the statistic value includes a standard deviation and a plus or minus sign.

A method for configuring a head-up display of the disclosure includes the following steps. A first coordinate value corresponding to a line of sight of a person is obtained, and a statistic value corresponding to the first coordinate value is obtained. The first coordinate value and the statistic value are input to a quantum machine learning model, and a first estimated statistic value being obtained. A display area of the head-up display is configured by the first coordinate value and the first estimated statistic value.

In an embodiment of the disclosure, the method further comprising: obtaining a speed of a vehicle through the transceiver; and configuring a size of the display area by the speed.

In an embodiment of the disclosure, the speed is inversely proportional to the size.

In an embodiment of the disclosure, the method further comprising: obtaining an average gaze duration corresponding to the line of sight of the person through the transceiver;

and configuring a display content of the head-up display by the average gaze duration, wherein an amount of information of the display content is inversely proportional to the average gaze duration.

In an embodiment of the disclosure, the method further comprising: obtaining a speed of a vehicle through the transceiver; and determining the amount of information by the speed, wherein the amount of information is inversely proportional to the speed.

In an embodiment of the disclosure, the method further comprising: judging a writing direction by a display content of the head-up display; and determining a position of the display content in the display area by the writing direction.

In an embodiment of the disclosure, the method further comprising: obtaining training data of the quantum machine learning model through the transceiver, wherein the training data comprises a historical coordinate value, a historical statistic value, a historical speed corresponding to a vehicle, and a historical relative traffic flow corresponding to the vehicle; calculating an ideal statistic value corresponding to a line of sight of a person by the historical coordinate value, the historical statistic value, the historical speed, and the historical relative traffic flow; and training the quantum machine learning model by a loss function, wherein the loss function is associated with an error between an output statistic value of the quantum machine learning model and the ideal statistic value.

In an embodiment of the disclosure, obtaining a plurality of probabilities respectively corresponding to a plurality of candidate statistic values output by the quantum machine learning model by the first coordinate value and the statistic value; and selecting a candidate statistic value corresponding to a maximum probability from the candidate statistic values by the probabilities as the first estimated statistic value.

In an embodiment of the disclosure, the method further comprising: obtaining a second coordinate value corresponding to the line of sight through the transceiver; inputting the second coordinate value and the first estimated statistic value to the quantum machine learning model, and a second estimated statistic value being obtained; and configuring the display area by the second coordinate value and the second estimated statistic value.

In an embodiment of the disclosure, the statistic value comprises a standard deviation and a plus or minus sign.

Based on the above, the electronic device of the disclosure can dynamically adjust the display area of the head-up display according to the line of sight of the driver. In addition to preventing the projected image of the head-up display from continuously obscuring a specific area and reducing the grasp of road conditions by the driver, the electronic device can also assist the driver to understand the information displayed on the head-up display more quickly and correctly.

DETAILED DESCRIPTION OF DISCLOSED EMBODIMENTS

For a driver, a head-up display often distracts the driver, so a display position and display information of projection of the head-up display must be carefully arranged to not affect the viewing of road conditions or the judgement of a driving state by the driver. In order to facilitate the viewing of information displayed on the head-up display by the driver, a display area of the head-up display needs to be associated with the line of sight of the driver. However, the line of sight of the driver is affected by multiple factors. In order to predict the line of sight of the driver line with machine learning technology, a very large number of training samples and computing resources are required. In view of this, the disclosure provides a method for configuring a head-up display based on the visual flow theory of quantum mechanics, which improves the communication process between the driver and a vehicle through parameters such as gaze duration, the speed of the vehicle, and traffic flow to intelligently adjust the display area and a display content of the head-up display. The disclosure can prevent the head-up display from distracting the driver, so as to improve the driving safety of the driver.

Figure 1:
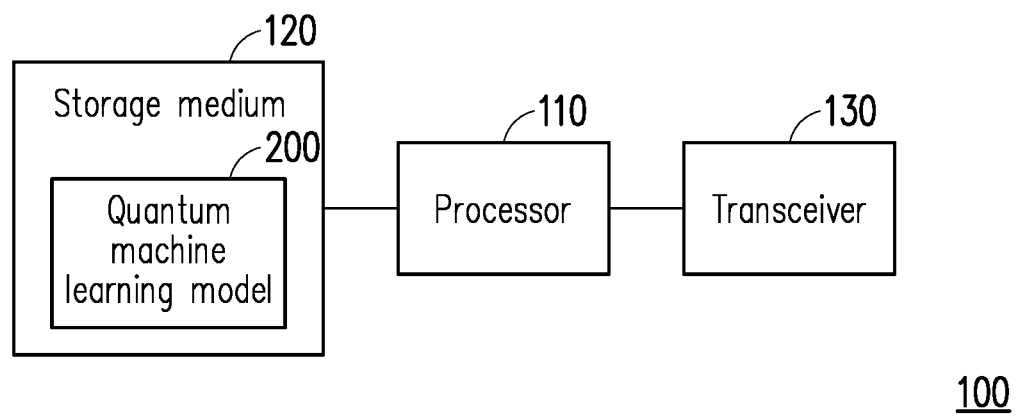
FIG. 1 is a schematic diagram of an electronic device for configuring a head-up display according to an embodiment of the disclosure.

FIG. 1 is a schematic diagram of an electronic device 100 for configuring a head-up display according to an embodiment of the disclosure. The electronic device 100 includes a processor 110, a storage medium 120, and a transceiver 130.

The processor 110 is, for example, a central processing unit (CPU), other programmable general-purpose or specific-purpose micro control units (MCUs), microprocessors, digital signal processors (DSPs), programmable controllers, application specific integrated circuits (ASICs), graphics processing units (GPUs), image signal processors (ISPs), image processing units (IPUs), arithmetic logic units (ALUs), complex programmable logic devices (CPLDs), field programmable gate arrays (FPGAs), other similar elements, or a combination of the above elements. The processor 110 may be coupled to the storage medium 120 and the transceiver 130, and access and execute multiple modules and various application programs stored in the storage medium 120.

The storage medium 120 is, for example, any type of fixed or removable random access memory (RAM), read-only memory (ROM), flash memory, hard disk drive (HDD), a solid state drive (SSD), similar elements, or a combination of the above elements and is used to store multiple modules or various application programs executable by the processor 110. In the embodiment, the storage medium 120 may store multiple modules including a quantum machine learning model 200, and the functions thereof will be described later.

The transceiver 130 transmits and receives a signal in a wireless or wired manner. The transceiver 130 may also execute an operation such as low noise amplification, impedance matching, frequency mixing, up or down frequency conversion, filtering, and amplification.

Figure 2:
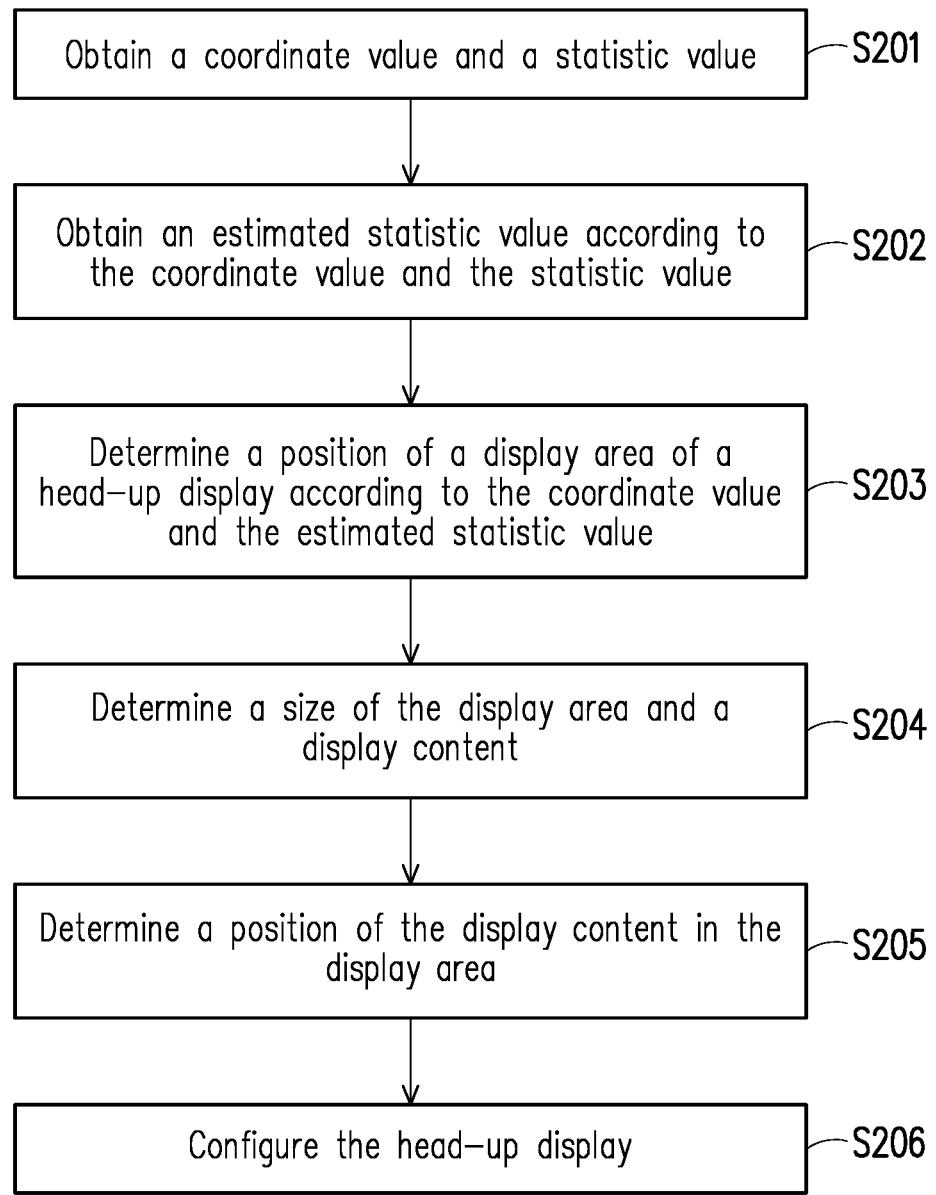
FIG. 2 is a flowchart of a method for configuring a head-up display according to an embodiment of the disclosure.

FIG. 2 is a flowchart of a method for configuring a head-up display according to an embodiment of the disclosure, wherein the method may be implemented by the electronic device 100 shown in FIG. 1. It should be noted that the flowchart of FIG. 2 is not used to limit the execution sequence of Step S203 to Step S205. For example, Step S205 may be executed before Step S204 and may also be executed after Step S204.

The electronic device 100 may be communicatively connected to the head-up display through the transceiver 130 and may configure the head-up display to project an image displayed on the head-up display to a display area on a medium (for example, a windshield). In Step S201, the processor 110 may obtain a coordinate value (x(t), y(t)) corresponding to the line of sight of the driver through the transceiver 130, and obtain a statistic value (±Δx(t–ΔT), ±Δy(t–ΔT)) corresponding to the coordinate value, where x(t) is an X-coordinate value of a position where the line of sight of the driver is gazing at a time point t, y(t) is a Y-coordinate value of the position where the line of sight of the driver is gazing at the time point t, Δx(t–ΔT) is a standard deviation of the line of sight of the driver on an X-axis at a time point (t–ΔT), and Δy(t–ΔT) is a standard deviation of the line of sight of the driver on a Y-axis at the time point (t–ΔT), where ΔT is a sampling time interval. The X-axis and the Y-axis may correspond to a Cartesian coordinate system. The unit of the coordinate value may include, but is not limited to, pixels.

In an embodiment, the processor 110 may be communicatively connected to a camera through the transceiver 130, wherein the camera is used to capture an image of the face of the driver. The processor 110 may execute iris tracking technology on the image to judge the position where the line of sight of the driver stays on the windshield, thereby obtaining the coordinate value (x(t), y(t)) according to the position. In other words, the coordinate value (x(t), y(t)) is correlated with the fixation or the refixation of the driver of the windshield.

The two eyes of the driver may respectively gaze at different positions on the windshield. Accordingly, the processor 110 may perform correction related to binocular vision on the coordinate value (x(t), y(t)). For example, the processor 110 may obtain two coordinate values respectively corresponding to the lines of sight of the two eyes, and calculate an average of the two coordinate values to generate a corrected coordinate value (that is, the coordinate value (x(t), y(t))). Taking the coordinate value x(t) as an example, as shown in Equation (1), x1(t) is the X-coordinate value of the position where the line of sight of the left eye of the driver is gazing at the time point t, and x2(t) is the X-coordinate value of the position where the line of sight of the right eye of the driver is gazing at the time point t.

$$x(t) = \frac{x1(t) + x2(t)}{2} \quad (1)$$

After obtaining the coordinate value (x(t), y(t)), the processor 110 may further obtain the statistic value (±Δx(t–ΔT), ±Δy(t–ΔT)) corresponding to the time point t. The statistic value may include a standard deviation and a plus or minus sign. There are two types of sources of the statistic value (±Δx(t–ΔT), ±Δy(t–ΔT)). Specifically, the quantum machine learning model 200 may generate the statistic value corresponding to the current time point according to the statistic value corresponding to the previous time point. For example, if the processor 110 detects that the quantum machine learning model 200 has output a statistic value (±Δx(t–2ΔT), ±Δy(t–2ΔT)), the processor 110 may input (±Δx(t–2ΔT), ±Δy(t–2ΔT)) to the quantum machine learning model 200 to obtain the statistic value (±Δx(t–ΔT), ±Δy(t–ΔT)), where ΔT is the sampling time interval. On the other hand, if the processor 110 does not detect any statistic value output by the quantum machine learning model 200, it means that the processor 110 cannot obtain the statistic value (±Δx(t–ΔT), ±Δy(t–ΔT)) by using the quantum machine learning model 200. Accordingly, the processor 110 may calculate the statistic value (±Δx(t–ΔT), ±Δy(t–ΔT)) according to historical data sampled before the time point (t–ΔT). For example, the processor 110 may calculate the statistic value (±Δx(t–ΔT), ±Δy(t–ΔT)) according to multiple historical coordinate values such as a coordinate value (x(t–n), y(t–n)), a coordinate value (x(t–n+1), y(t–n+1)), ..., a coordinate value (x(t–3ΔT), y(t–3ΔT)), and a coordinate value (x(t–2ΔT), y(t–2ΔT)). In short, if the statistic value (±Δx(t–ΔT), ±Δy(t–ΔT)) is an initial statistic value, the processor 110 calculates the statistic value (±Δx(t–ΔT), ±Δy(t–ΔT)) according to the historical coordinate values. If the statistic value (±Δx(t–ΔT), ±Δy(t–ΔT)) is not the initial statistic value, the processor 110 obtains the statistic value (±Δx(t–ΔT), ±Δy(t–ΔT)) by using the quantum machine learning model 200.

In an embodiment, the processor 110 may also judge a time period when the line of sight of the driver stays at a specific position on the windshield through the iris tracking technology. Taking the coordinate value (x(t), y(t)) as an example, the processor 110 may judge that the period when the driver is gazing at the coordinate value (x(t), y(t)) is ΔD(t) according to the iris tracking technology. If there is a character projected by the head-up display on the coordinate value (x(t), y(t)), the processor 110 may define the period ΔD(t) as the gaze duration corresponding to the time point t. The processor 110 may calculate an average gaze duration $\overline{\Delta D}$ of the driver according to multiple gaze durations respectively corresponding to multiple different time points. Generally, the faster the reading speed of the driver, the shorter the average gaze duration $\overline{\Delta D}$ of the driver.

The two eyes of the driver may correspond to different gaze durations. Accordingly, the processor 110 may perform the correction related to the binocular vision for the gaze duration ΔD(t). In an embodiment, the processor 110 may obtain two gaze durations respectively corresponding to the lines of sight of the two eyes, and calculate an average of the two gaze durations to generate a corrected gaze duration (that is, the gaze duration ΔD(t)). As shown in Equation (2), ΔD1(t) is the gaze duration corresponding to the left eye of the driver, and ΔD2(t) is the gaze duration corresponding to the right eye of the driver.

$$\Delta D(t) = \frac{\Delta D1(t) + \Delta D2(t)}{2} \quad (2)$$

In an embodiment, the processor 110 may select the longer gaze duration from the two gaze durations as the corrected gaze duration (that is, the gaze duration ΔD(t)). As shown in Equation (3), ΔD1(t) is the gaze duration corresponding to the left eye of the driver, and ΔD2(t) is the gaze duration corresponding to the right eye of the driver.

$$\Delta D(t) = \max(\Delta D1(t), \Delta D2(t)) \quad (3)$$

After obtaining the coordinate value (x(t), y(t)) and the statistic value (±Δx(t–ΔT), ±Δy(t–ΔT)), in Step S202, the processor 110 inputs the coordinate value (x(t), y(t)) and the statistic value (±Δx(t–ΔT), ±Δy(t–ΔT)) to the quantum machine learning model 200 to obtain an estimated statistic value (±Δx(t), ±Δy(t)). Specifically, the quantum machine learning model 200 may output multiple probabilities respectively corresponding to multiple candidate statistic values according to the input coordinate value (x(t), y(t)) and statistic value (±Δx(t−ΔT), ±Δy(t−ΔT)). The processor 110 may select a candidate statistic value corresponding to the maximum probability from the candidate statistic values according to the probabilities as the estimated statistic value (±Δx(t), ±Δy(t)).

Figure 3:
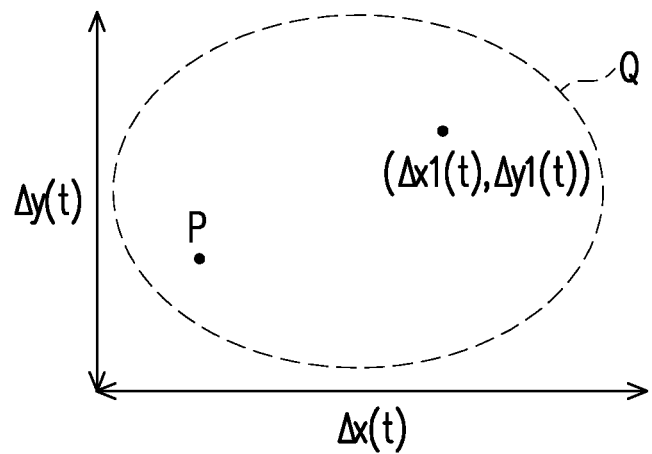
FIG. 3 is a schematic diagram of a set Q according to an embodiment of the disclosure.

FIG. 3 is a schematic diagram of a set Q according to an embodiment of the disclosure. The quantum machine learning model 200 may define the set Q according to the input coordinate value (x(t), y(t)) and statistic value (±Δx(t−ΔT), ±Δy(t−ΔT)) based on the visual flow theory of quantum mechanics, where the set Q includes all candidates of the estimated statistic value (+Δx(t), ±Δy(t)). The quantum machine learning model 200 also generates a probability corresponding to each candidate in the set Q. Taking a candidate statistic value (±Δx1(t), ±Δy1(t)) in the Q set as an example, the quantum machine learning model 200 may generate a probability Ω(±Δx1(t), ±Δy1(t)) corresponding to the candidate statistic value (±Δx1(t), ±Δy1(t)). If the candidate statistic value (±Δx1(t), ±Δy1(t)) has the maximum probability in the Q set, the processor 110 may select the candidate statistic value (±Δx1(t), ±Δy1(t)) from the Q set as the estimated statistic value (±Δx(t), ±Δy(t)). In other words, the probability Ω(±Δx1(t), ±Δy1(t)) of the candidate statistic value (±Δx1(t), ±Δy1(t)) needs to satisfy the limitation of Equation (4), where P is any point in the set Q.

$$\Omega(\pm\Delta x1(t), \pm\Delta y1(t)) \geq \Omega(P), \forall P \in Q \quad (4)$$

The quantum machine learning model 200 may be trained by the processor 110 based on, for example, a quantum annealing algorithm. Specifically, the processor 110 may be connected to an external sensor (for example, a camera, a lidar, or a speedometer) through the transceiver 130 to obtain training data of the quantum machine learning model 200 from the external sensor. The training data may include a historical coordinate value (x(k), y(k)), a historical statistic value (±Δx(k−ΔT), ±Δy(k−ΔT)), a historical speed v(k) corresponding to the speed of the vehicle to the vehicle, and a historical relative traffic flow r(k) corresponding to the vehicle, where a time point k precedes the time point t. The historical relative traffic flow r(k) represents the number of other vehicles approaching the vehicle per unit time before the time point k. The processor 110 may calculate an ideal statistic value (I(±Δx(k)), I(±Δy(k))) corresponding to the line of sight of the driver according to Equation (5), where Cx and Cy are predefined constants.

$$\begin{cases} I(\pm\Delta x(k)) \cdot v(k) \cdot r(k) = Cx, \forall k \\ I(\pm\Delta y(k)) \cdot v(k) \cdot r(k) = Cy, \forall k \end{cases} \quad (5)$$

The processor 110 may train the quantum machine learning model 200 according to a loss function L, wherein the loss function L is used to represent an error between an output statistic value of the machine learning model 200 and the ideal statistic value (I(±Δx(k)), I(±Δy(k))). As shown in Equation (6), Î represents the output statistic value of the machine learning model 200, I represents the ideal statistic value (that is, (I(±Δx(k)), I(±Δy(k)))), and E(Î,I) represents the error between the output statistic value Î and the ideal statistic value I, wherein the error includes, but is not limited to, a mean square error (MSE) or a mean absolute error (MAE). The processor 110 may input the historical coordinate value (x(k), y(k)) and the historical statistic value (±Δx(k−ΔT), ±Δy(k−ΔT)) to the quantum machine learning model 200 under training to obtain the output statistic value Î, and train the quantum machine learning model 200 through minimizing the loss function L.

$$L = E(\hat{I}, I) \quad (6)$$

Figure 4:
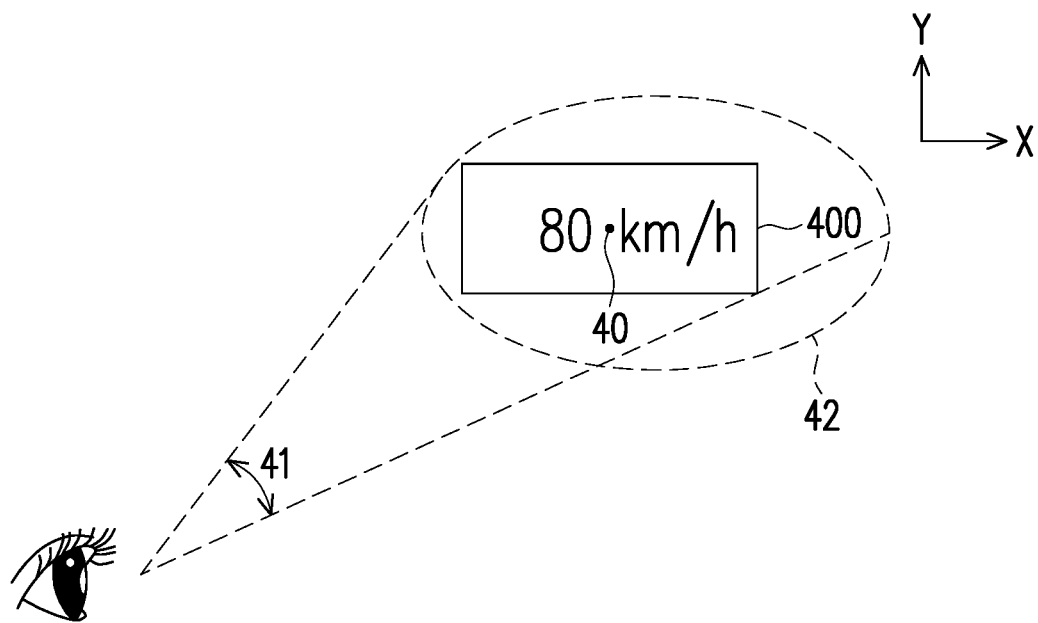
FIG. 4 is a schematic diagram of a display content of a head-up display according to an embodiment of the disclosure.

Returning to FIG. 2, in Step S203, the processor 110 may determine a position of the display area of the head-up display according to the coordinate value (x(t), y(t)) and the estimated statistic value (±Δx(t), ±Δy(t)). FIG. 4 is a schematic diagram of a display content of a head-up display according to an embodiment of the disclosure. In an embodiment, the processor 110 may calculate a coordinate value (C1, C2) of a center point 40 of a display area 400 according to Equation (7), so as to determine the position of the display area 400.

$$\begin{cases} C1 = x(t) \pm \Delta x(t) \\ C2 = y(t) \pm \Delta y(t) \end{cases} \quad (7)$$

The display content may include, but is not limited to, instrument panel information, navigation information, or warning information. Taking the application of an adaptive cruise control (ACC) system or an AR system as an example, it is assumed that the vehicle is installed with the electronic device 100 of the disclosure. When the vehicle encounters an obstacle ahead, in addition to the ACC system that can automatically decelerate, the electronic device 100 may project the warning information to the display area in conjunction with the head-up display, so as to prompt the driver that the ACC system has intervened in the operation of the vehicle to prevent the driver from panicking.

In Step S204, the processor 110 may determine the size of the display area 400 and the display content to be projected to the display area 400 by the head-up display. Specifically, the processor 110 may configure the size of the display area 400 according to a current speed v(t) of the vehicle. The processor 110 may be connected to the speedometer of the vehicle through the transceiver 130 to obtain the speed v(t). On the other hand, the processor 110 may configure the display content according to the average gaze duration $\overline{AD}$ of the driver.

In an embodiment, the speed (for example, the speed v(t)) of the vehicle is inversely proportional to the size of the display area 400. The angle of view (AoV) of human eyes is related to the speed of the vehicle. When the speed of the vehicle is faster, the angle of view of the driver is reduced, and the field of view (FoV) of the driver of the windshield is also reduced, as shown in the example of Table 1. In order to ensure that all the content of the display area 400 can be read by the driver, the processor 110 may configure the length of the display area 400 in the horizontal direction (that is, the X-axis) with reference to Table 1, so that the display area 400 does not exceed the field of view of the driver. As shown in FIG. 4, a reference numeral 41 is the angle of view of the driver, and a reference numeral 42 is the field of view of the driver of the windshield.

TABLE 1

| Speed of vehicle (km/h) | Angle of view of driver in horizontal direction (°) |
|---|---|
| 40 | 100 |
| 70 | 65 |
| 100 | 40 |

In an embodiment, the average gaze duration ΔD of the driver is inversely proportional to the amount of information of the display content. The speed of the vehicle is inversely proportional to the reaction time of the driver (that is, the time required for the driver to perceive a danger until the driver starts to execute effective braking). When the speed of the vehicle is faster, the reaction time of the driver is shortened. Considering the safety of driving, the time for the driver to read the display content should be less than the reaction time of the driver. If the amount of information that can be included in the display content is quantified as a maximum number of characters M, the maximum number of characters M must satisfy the limitation of Equation (8), where RT(v(t)) may represent the reaction time of the driver when the speed of the vehicle is v(t).

$$\overline{\Delta D} \cdot M < RT(v(t)) \qquad (8)$$

In an embodiment, the storage medium 120 may pre-store a relationship mapping table of the speed of the vehicle and the reaction time of the driver. The processor 110 may determine the maximum number of characters M according to the relationship mapping table. For example, assuming that the average gaze duration $\overline{\Delta D}$ of the driver is 30 ms, the display content of the head-up display is expected to include 5 characters, and the processor 110 judges that the reaction time RT(v(t)) of the driver is 1600 ms according to the speed of the vehicle and the relationship mapping table. Since 30*5<1600, the processor 110 may judge that the 5 characters included in the display content do not exceed the maximum number of characters M. Therefore, all of the 5 characters may be included in the display content. It can be seen from Equation (8) that the amount of information of the display content is proportional to the reaction time and is inversely proportional to the speed of the vehicle. In other words, the faster the vehicle, the less the amount of information the head-up display can display. The slower the vehicle, the more the amount of information the head-up display can display.

In Step S205, the processor 110 may determine the position of the display content in the display area 400. Specifically, the processor 110 may judge a writing direction of the display content of the head-up display, and determine the position of the display content in the display area 400 according to the writing direction. Assuming that a sentence is written from left to right, when a reader is reading the sentence, the reader allocates less attention resources to a left area of the sentence. Most of the attention resources are allocated to a right area including characters that are being read or have not yet been read. The right area is referred to as the perceptual span. Accordingly, the processor 110 may judge where in the display area belongs to the perceptual span according to the writing direction of the display content, thereby setting the display content at a position in the display area 400 that is more inclined to the perceptual span.

Taking FIG. 4 as an example, the display content of the display area 400 includes 6 characters such as "8", "0", "k", "m", "/", and "h". Since the writing direction of the display content is from left to right, the processor 110 may judge that the perceptual span of the driver is located in the right area (that is, the right side of the center point 40 or the positive X direction of the center point 40) of the display area 400. Accordingly, the processor 110 may configure most of the display content on the right side of the center point 40, and configure a small part of the display content on the left side of the center point 40 (that is, the negative X direction of the center point 40). In FIG. 4, the processor 110 configures 4 characters in the display content on the right side of the center point 40, and configures 2 characters in the display content on the left side of the center point 40.

In Step S206, the processor 110 may configure the head-up display according to parameters such as the display content, the position of the display content, the size of the display area, and the position of the display area through the transceiver 130.

Figure 5:
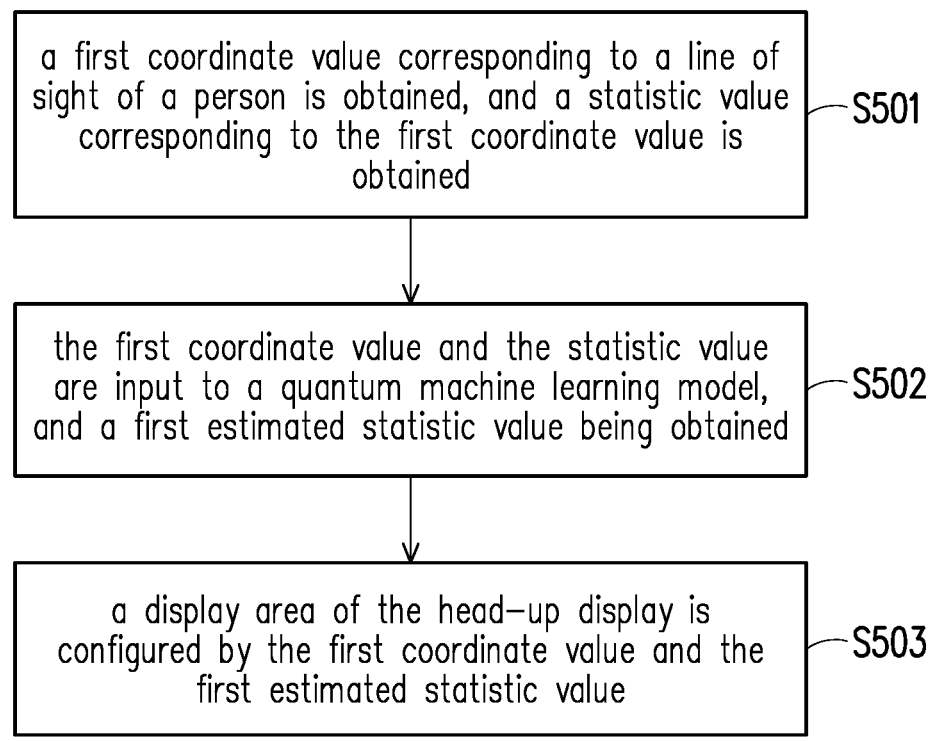
FIG. 5 is a flowchart of a method for configuring a head-up display according to an embodiment of the disclosure.

FIG. 5 is a flowchart of a method for configuring a head-up display according to an embodiment of the disclosure, wherein the method may be implemented by the electronic device 100 shown in FIG. 1. In Step S501, a first coordinate value corresponding to a line of sight of a person is obtained, and a statistic value corresponding to the first coordinate value is obtained. In Step S502, the first coordinate value and the statistic value are input to a quantum machine learning model, and a first estimated statistic value being obtained. In Step S503, a display area of the head-up display is configured by the first coordinate value and the first estimated statistic value.

In summary, the electronic device of the disclosure estimates where the line of sight of the driver will stay according to the line of sight of the driver and the quantum machine learning model, and sets the display area of the head-up display there. By dynamically adjusting the position of the display area, a specific area of the windshield may be prevented from being continuously obscured. The electronic device may determine the size of the display area, the amount of display content, etc. according to factors such as the gaze duration of the driver, the speed of the vehicle, and traffic flow to prevent displaying excessive information to the driver when the reaction time of the driver is short and distracting the driver. In response to the different writing directions of the characters displayed on the head-up display, the electronic device may adjust the position of the display content in the display area based on the perceptual span theory to assist the driver to understand the information displayed on the head-up display more quickly and correctly.

What is claimed is:

1. An electronic device for configuring a head-up display, comprising:
   a transceiver;
   a storage medium, storing a quantum machine learning model; and
   a processor, coupled to the storage medium and the transceiver, wherein the processor executes:
   obtaining a first coordinate value corresponding to a line of sight of a person through the transceiver, and obtaining a statistic value corresponding to the first coordinate value;
   inputting the first coordinate value and the statistic value to the quantum machine learning model, and a first estimated statistic value being obtained;
   configuring a display area of the head-up display by the first coordinate value and the first estimated statistic value;
   judging a writing direction by a display content of the head-up display;
   determining a position of the display content in the display area by the writing direction and determining a perceptual span of the person according to the writing direction of the display content and the first coordinate value, wherein when the writing direction of the display content is determined to be written from left to right, the processor determines a right side of the display area with respect to a center point of the display area as the perceptual span of the person, and the processor is configured to display a larger portion of the display content on the right side of the display area as compared to a portion of the display content being displayed on a left side of the display area with respect to the center point;

obtaining training data of the quantum machine learning model through the transceiver, wherein the training data comprises a historical coordinate value, a historical statistic value, a historical speed corresponding to a vehicle, and a historical relative traffic flow corresponding to the vehicle, wherein the historical relative traffic flow represents a number of other vehicles approaching the vehicle per unit time before a time point;

calculating an ideal statistic value corresponding to a line of sight of a person by the historical coordinate value, the historical statistic value, the historical speed, and the historical relative traffic flow; and training the quantum machine learning model by a loss function, wherein the loss function is associated with an error between an output statistic value of the quantum machine learning model and the ideal statistic value.

2. The electronic device according to claim 1, wherein the processor further executes:

obtaining a speed of a vehicle through the transceiver; and
configuring a size of the display area by the speed.

3. The electronic device according to claim 2, wherein the speed is inversely proportional to the size.

4. The electronic device according to claim 1, wherein the processor further executes:

obtaining an average gaze duration corresponding to the line of sight of the person through the transceiver; and
configuring the display content of the head-up display by the average gaze duration, wherein an amount of information of the display content is inversely proportional to the average gaze duration.

5. The electronic device according to claim 4, wherein the processor further executes:

obtaining a speed of a vehicle through the transceiver; and
determining the amount of information by the speed, wherein the amount of information is inversely proportional to the speed.

6. The electronic device according to claim 1, wherein the processor further executes:

obtaining a plurality of probabilities respectively corresponding to a plurality of candidate statistic values output by the quantum machine learning model by the first coordinate value and the statistic value; and
selecting a candidate statistic value corresponding to a maximum probability from the candidate statistic values by the probabilities as the first estimated statistic value.

7. The electronic device according to claim 1, wherein the processor further executes:

obtaining a second coordinate value corresponding to the line of sight through the transceiver;
inputting the second coordinate value and the first estimated statistic value to the quantum machine learning model, and a second estimated statistic value being obtained; and
configuring the display area by the second coordinate value and the second estimated statistic value.

8. The electronic device according to claim 1, wherein the statistic value comprises a standard deviation and a plus or minus sign.

9. A method for configuring a head-up display, comprising:

obtaining a first coordinate value corresponding to a line of sight of a person through a transceiver, and obtaining a statistic value corresponding to the first coordinate value;

inputting the first coordinate value and the statistic value to a quantum machine learning model, and a first estimated statistic value being obtained;

configuring a display area of the head-up display by the first coordinate value and the first estimated statistic value;

judging a writing direction by a display content of the head-up display;

determining a position of the display content in the display area by the writing direction and determining a perceptual span of the person according to the writing direction of the display content and the first coordinate value, wherein when the writing direction of the display content is determined to be written from left to right, the processor determines a right side of the display area with respect to a center point of the display area as the perceptual span of the person, and the processor is configured to display a larger portion of the display content on the right side of the display area as compared to a portion of the display content being displayed on a left side of the display area with respect to the center point;

obtaining training data of the quantum machine learning model through the transceiver, wherein the training data comprises a historical coordinate value, a historical statistic value, a historical speed corresponding to a vehicle, and a historical relative traffic flow corresponding to the vehicle, wherein the historical relative traffic flow represents a number of other vehicles approaching the vehicle per unit time before a time point;

calculating an ideal statistic value corresponding to a line of sight of a person by the historical coordinate value, the historical statistic value, the historical speed, and the historical relative traffic flow; and training the quantum machine learning model by a loss function, wherein the loss function is associated with an error between an output statistic value of the quantum machine learning model and the ideal statistic value.

10. The method for configuring a head-up display according to claim 9, further comprising:

obtaining a speed of a vehicle through the transceiver; and
configuring a size of the display area by the speed.

11. The method for configuring a head-up display according to claim 10, wherein the speed is inversely proportional to the size.

12. The method for configuring a head-up display according to claim 9, further comprising:

obtaining an average gaze duration corresponding to the line of sight of the person through the transceiver; and
configuring the display content of the head-up display by the average gaze duration, wherein an amount of information of the display content is inversely proportional to the average gaze duration.

13. The method for configuring a head-up display according to claim 12, further comprising:

obtaining a speed of a vehicle through the transceiver; and
determining the amount of information by the speed, wherein the amount of information is inversely proportional to the speed.

14. The method for configuring a head-up display according to claim 9, further comprising:

obtaining a plurality of probabilities respectively corresponding to a plurality of candidate statistic values output by the quantum machine learning model by the first coordinate value and the statistic value; and selecting a candidate statistic value corresponding to a maximum probability from the candidate statistic values by the probabilities as the first estimated statistic value.

15. The method for configuring a head-up display according to claim 9, further comprising:

obtaining a second coordinate value corresponding to the line of sight through the transceiver;

inputting the second coordinate value and the first estimated statistic value to the quantum machine learning model, and a second estimated statistic value being obtained; and configuring the display area by the second coordinate value and the second estimated statistic value.

16. The method for configuring a head-up display according to claim 9, wherein the statistic value comprises a standard deviation and a plus or minus sign.

\* \* \* \* \*